US005473015A

United States Patent [19]
DeNicola, Jr. et al.

[11] Patent Number: 5,473,015
[45] Date of Patent: Dec. 5, 1995

[54] BLENDS OF A GRAFT COPOLYMER OF PROPYLENE POLYMER MATERIAL WITH A GRAFT COPOLYMER OF OLEFINIC RUBBER MATERIAL

[75] Inventors: Anthony J. DeNicola, Jr., Newark, Del.; Paul D. Tatarka, Randolph, N.J.

[73] Assignee: Montell North America Inc., Wilmington, Del.

[21] Appl. No.: 347,932

[22] Filed: Dec. 1, 1994

Related U.S. Application Data

[60] Division of Ser. No. 847,387, Mar. 6, 1992, Pat. No. 5,397,836, which is a continuation-in-part of Ser. No. 593,142, Oct. 5, 1990, abandoned.

[51] Int. Cl.⁶ .............................. C08L 51/04; C08L 51/06
[52] U.S. Cl. .............................. 525/71; 525/74; 525/78; 525/80; 525/86
[58] Field of Search .................. 525/71, 74, 78, 525/80, 86

[56] References Cited

U.S. PATENT DOCUMENTS 5,159,004  10/1992  Furuta et al. ........................ 524/390

*Primary Examiner*—Melvyn I. Marquis
*Assistant Examiner*—D. Aylward

[57] ABSTRACT

Disclosed are blends comprising a graft copolymer of a propylene polymer material, a graft copolymer of olefin rubber material, and optionally an ungrafted olefin rubber, wherein the grafting monomers are selected from the group consisting of (i) aromatic vinyl compounds, (ii) acrylic compounds, (iii) mixtures of (i) and (ii), and (iv) other copolymerizable monomers with at least one (i) or at least one (ii) or mixtures of at least one (i) and at least one (ii).

9 Claims, No Drawings

BLENDS OF A GRAFT COPOLYMER OF PROPYLENE POLYMER MATERIAL WITH A GRAFT COPOLYMER OF OLEFINIC RUBBER MATERIAL

This application is a division of application Ser. No. 07/847,387, filed Mar. 6, 1992, now U.S. Pat. No. 5,397,836 which application is a continuation-in-part of U.S. patent application Ser. No. 07/593,142, filed Oct. 5, 1990, now abandoned.

FIELD OF THE INVENTION

This invention relates to blends comprising a grafted copolymer of propylene polymer material, a graft copolymer of olefin rubber material, and optionally an ungrafted olefin rubber, wherein the grafting monomers are (i) aromatic vinyl compounds, (ii) acrylic compounds, (iii) mixtures of (i) and (ii), or (iv) other copolymerizable monomers with at least one (i) or at least one (ii) or mixtures of at least one (i) and at least one (ii).

BACKGROUND OF THE INVENTION

Typically, graft copolymers of olefin polymer materials have been impact modified with ethylene/propylene copolymer rubber, ethylene/propylene/diene monomer rubber, and ASA polymers. For example, U.S. Pat. No. 3,314,904 describes forming a "gum plastic" by making a graft copolymer of styrene on polyethylene or polypropylene, and, in particular, a graft interpolymer of styrene, acrylonitrile, and polyethylene or polypropylene, and blending the graft copolymer with certain selected compatible rubbery materials. The grafted styrene or styrene/acrylonitrile content of the graft copolymer is 75–95%, preferably 85–95%, and more preferably 90–95%. Hence the graft copolymer is predominantly bound styrene or bound styrene/acrylonitrile, and in the graft copolymers made from polypropylene, the polypropylene is only a minor component and present as a dispersed phase. Thus the properties of the bound styrene or styrene/acrylonitrile predominate. The graft copolymer is made by subjecting the polyolefin to high-energy ionizing radiation, and then contacting the irradiated polyolefin with styrene or with styrene and acrylonitrile.

U.S. Pat. No. 4,537,933 discloses a blend of a polyolefin graft polymer, preferably a polyvinyl halide polyolefin graft polymer, and an ASA polymer. The ASA polymer is a copolymer of styrene and acrylonitrile (SAN) that is modified with an acrylate polymer, a chlorinated polyethylene or an olefin-diolefin modified polymer, such as an ethylene/propylene polyene modified polymer. The ASA polymer modified with the olefin-diolefin modified polymer has a styrene/acrylonitrile content of 60–95%. The properties of the SAN predominate since the rubber is only a minor component and present as a dispersed phase. Also, the matrix phase of the polymeric components must be miscible.

SUMMARY OF THE INVENTION

It has now been found that by functionalizing olefin rubber materials and blending said functionalized olefin rubber with a graft copolymer of a propylene polymer material, wherein the chains of the polymerizable (co)monomers used to functionalize the rubber and grafted on the propylene polymer are of a similar chemical structure, blends are obtained having improved weldline strength, impact strength and stiffness while retaining a balance of other properties. The blends are useful as stand-alone structural plastics for injection molding articles and extruded profiles.

According to one embodiment of the present invention, there is provided a blend which comprises (a) a graft copolymer of a propylene polymer material having a polymerized monomer content of 5 to 70% and (b) a graft copolymer of an olefin rubber having a polymerized monomer content of 5 to 50%, wherein the grafting monomers are selected from (i) an aromatic vinyl compound, (ii) an acrylic compound, (iii) mixtures of (i) and (ii), and (iv) other copolymerizable monomers selected from the group consisting of $C_{1-10}$ linear or branched alkyl acrylates, acrylic acid, methacrylic acid, glycidyl methacrylate, glycidyl acrylate, acrylonitrile and methacrylonitrile with at least one (i) or at least one (ii) or mixtures of at least one (i) and at least one (ii).

According to another embodiment of the present invention, there is provided a blend which comprises (a) a graft copolymer of a propylene polymer material having a polymerized monomer content of 5 to 70%, (b) a graft copolymer of an olefin rubber having a polymerized monomer content of from 5 to 50%, and (c) an ungrafted olefin rubber, wherein the grafting monomers are selected from the group consisting of (i) an aromatic vinyl compound, (ii) an acrylic compound, (iii) mixtures of (i) and (ii), and (iv) other polymerizable monomers selected from the group consisting of $C_{1-10}$ linear or branched alkyl acrylate, acrylic acid, methacrylic acid, glycidyl methacrylate, glycidyl acrylate, acrylonitrile and methacrylonitrile with at least one (i) or at least one (ii) wherein said other polymerizable monomer is present in an amount of up to 50% and the total amount of (b)+(c) is from 10 to 60%, by weight, of the total blend.

DETAILED DESCRIPTION OF THE INVENTION

Unless otherwise specified all percentages and parts are by weight in this specification.

The propylene polymer material backbone of component (a) can be (i) a homopolymer of propylene, (ii) a random copolymer of propylene and an olefin selected from ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16% or (iii) a random terpolymer of propylene with two alpha-olefins selected from the group consisting of ethylene and $C_4$–$C_8$ alpha-olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%. The $C_4$–$C_{10}$ alpha-olefins include linear or branched $C_4$–$C_{10}$ alpha-olefins such as 1-butene, 1-pentene, 4-methylpentene-1, 3-methyl-1-butene, 1-hexene, 3,4-dimethyl-1-butene, 1-heptene, 3-methyl-1-hexene and the like.

Preferred propylene polymer material backbones are polypropylene and ethylene/propylene random copolymer.

The olefin rubber backbone of component (b) can be (i) an ethylene/propylene copolymer rubber (EPR) having an ethylene content of from 30 to 70%, (ii) an ethylene/butene-1 copolymer rubber (EBR) having an ethylene content of from 30 to 70%, (iii) a propylene/butene-1 copolymer rubber (PBR) having a butene-1 content of from 30 to 70%, (iv) an ethylene/propylene/non-conjugated diene monomer rubber (EPDM) having an ethylene content of 30 to 70% and diene content of from 1 to 10%, (v) an ethylene/propylene/butene terpolymer rubber (EPBR) having a propylene content of from 1 to 10% and butene content of from 30 to 70% or a propylene content of from 30 to 70% and butene content of from 1 to 10%, (vi) a homopolymer of propylene impact modified with from 10 to 80% of an ethylene/propylene copolymer rubber, an ethylene/butene copolymer rubber, a propylene/butene copolymer rubber, an ethylene/propylene/non-conjugated diene monomer rubber and/or an ethylene/propylene/butene terpolymer rubber, (vii) a random copolymer of propylene and an olefin selected from ethylene and $C_4$-$C_{10}$ alpha-olefins impact modified with from 10 to 80% of (i), (ii), (iii), (iv) and/or (v). In (vi) and (vii) the ethylene content is from 30 to 70%; the diene content, if present, is from 2 to 8%; and when the EPB terpolymer is used, the propylene content is from 1 to 10% when the butene content is from 30 to 70%, or the propylene content is from 30 to 70% when the butene content is from 1 to 10%. Examples of the non-conjugated dienes include 1,4-hexadiene, ethylidene-norborene and dicyclopentadiene. The $C_4$-$C_{10}$ alpha-olefins include linear or branched $C_4$-$C_{10}$ alpha-olefins, such as 1-butene, 1-pentene, 4-methylpentene- 1, 3-methyl-1-butene and 1-hexene.

Preferably the olefin rubber backbones are ethylene/propylene/non-conjugated diene monomer rubber and ethylene/propylene rubber impact modified polypropylene.

When present, the ungrafted olefin rubber of component (c) is the same olefin rubber material as defined above for component (b).

The monomer(s) to be grafted onto the propylene polymer material backbone of component (a) and the olefin rubber backbone of component (b) can be (i) aromatic vinyl compounds selected from styrene, an alkyl or alkoxy ring-substituted styrene where the alkyl or alkoxy is a $C_{1-4}$ linear or branched alkyl or alkoxy, mixtures thereof wherein the alkyl or alkoxy ring-substituted styrene is present in an amount of from 5 to 95%, or mixtures of styrene or an alkyl or alkoxy ring-substituted styrene with 5 to 40% of alpha-methyl-styrene or alpha-methyl-styrene derivatives; (ii) acrylic compounds selected from methyl methacrylate, ethyl methacrylate, benzyl methacrylate, phenyl methacrylate or $C_{1-4}$ alkoxy substituted phenyl methacrylate; (iii) mixtures of (i) and (ii); or (iv) other copolymerizable monomers selected from linear or branched alkyl acrylates having from 1 to 10 carbon atoms, acrylic acid, methacrylic acid, glycidyl methacrylate, glycidyl acrylate, acrylonitrile or methacrylonitrile with at least one (i) or at least one (ii) or mixtures of at least one (i) and at least one (ii) wherein said other copolymerizable monomer is present in an amount of up to 50%, preferably 1 to 30%.

Preferred grafting monomers are styrene, methyl methacrylate, styrene/acrylonitrile, styrene/methyl methacrylate, methyl methacrylate/acrylonitrile, methyl methacrylate/methacrylonitrile, styrene/methyl methacrylate/methacrylonitrile and styrene/methyl methacrylate/acrylonitrile.

Suitable particulate forms of the grafted propylene polymer material include powder, flake, granulate, spherical, cubic and the like. Spherical particulate forms prepared from a propylene polymer material having a pore volume fraction of at least about 0.07 are preferred.

Most preferred for preparing the grafted propylene polymer material is a propylene polymer material having (1) a weight average diameter of about 0.4 to 7 mm, (2) a surface area of at least 0.1 m²/g, and (3) a pore volume fraction of at least about 0.07 wherein more than 40% of the pores in the particle have a diameter larger than 1 micron. Such propylene polymer materials are commercially available from HIMONT Italia S.r.l.

The grafted propylene polymer material and olefin rubber material of the present invention are prepared by the free radical-initiated graft polymerization of at least one monomer as set forth above, at free radical sites on propylene polymer material and olefin rubber material. The free radical sites may be produced by irradiation or by a free radical generating chemical material, e.g., by reaction with a suitable organic peroxide.

According to the method where the free radical sites are produced by irradiation, the propylene polymer material, preferably in particulate form, is irradiated at a temperature in the range of about 10° to 85° C. with high-energy ionizing radiation to produce free radical sites in the propylene polymer material. The irradiated propylene polymer material, while being maintained in a substantially non-oxidizing atmosphere, e.g., under inert gas, is then treated at a temperature up to about 100° C. for a period of at least about 3 minutes, with about from 5 to 80% of the particular grafting monomer or monomers used, based on the total weight of propylene polymer material and grafting monomer(s). After the propylene polymer material has been exposed to the monomer for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free radical deactivation of the resulting graft copolymer is conducted preferably by heating, although it can be accomplished by the use of an additive, e.g., methylmercaptan, that functions as a free radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free radical sites are produced by an organic chemical compound, the organic chemical compound, preferably an organic peroxide, is a free radical polymerization initiator which has a decomposition half-life of about 1 to 240 minutes at the temperature employed during the treatment. Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy- 3,5,5-trimethyl-cyclohexane, 2,5-dimethyl-2,5-di-tert-butylperoxyhexane, and bis(alpha-tert-butylperoxyisopropylbenzene); peroxy esters, such as tert-butylperoxypivalate, tert-butyl perbenzoate, 2,5-dimethylhexyl- 2,5-di(perbenzoate), tert-butyl-di(perphthalate), tert-butylperoxy-2-ethyl hexanoate; and 1,1-dimethyl-3-hydroxybutyl-peroxy- 2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. The peroxides can be used neat or in a diluent medium, having an active concentration of from 0.1 to 6.0 pph, preferably from 0.2 to 3.0 pph.

According to this method, the propylene polymer material, preferably in particulate form, at a temperature of from about 60° C. to 125° C. is treated with from 0.1 to 6.0 pph of a free radical polymerization initiator described above.

The polymer material is treated with about 5 to 240 pph of a grafting monomer at a rate of addition that does not exceed 4.5 pph per minute at all addition levels of 5 to 240 pph of the monomer, over a period of time which coincides with, or follows, the period of treatment with the initiator. In other words, the monomer and initiator may be added to the heated propylene polymer material at the same time or the monomer may be added 1) after the addition of the initiator has been completed, 2) after addition of the initiator has started but has not yet been completed, or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation.

The grafted copolymer of propylene polymer material, component (a) is present in the amount of from 40 to 90%, preferably from 45 to 80%, most preferably 50 to 70%, based on the total blend, however, when component (c) is present, preferably component (a) is present in the amount of from 60 to 85%. The grafted propylene polymer material has from 5 to 70% of the monomer graft polymerized thereto, and preferably from 25 to 55%.

The grafted copolymer of olefin rubber material, component (b) is present in the amount of from 10 to 60%, preferably from 20 to 55%, most preferably 30 to 50%, based on the total blend. The grafted olefin material has from 5 to 50% of the monomer graft polymerized thereto, and preferably from 10 to 45%.

In the blends of the present invention which contain the ungrafted olefin rubber of component (c), the total amount (b)+(c) is from 10 to 60%, by weight of the total blend, and preferably from 15 to 35%, wherein component (b) is present in an amount of from 5 to 40%, preferably from 10 to 25% and component (c) is present in an amount of from 5 to 20%, preferably from 5 to 10%.

Up to about 80 parts (total) of additives such as fillers, reinforcing agents, etc., per 100 parts of the graft copolymer and the rubber component can be included in the blend. In addition, the blend may contain about from 5 to 30 parts of a propylene polymer material per 100 parts of the graft copolymer and the rubber component, wherein suitable propylene polymer materials are as set forth herein for the propylene polymer material useful in preparing the graft copolymer.

The blends of the present invention are prepared by mechanically blending the components in conventional mixing equipment, i.e., a single or twin screw extruder, Banbury mixer or any other conventional melt compounding equipment. The order in which the components of the blend are mixed is not critical.

The present invention will be illustrated in greater detail with reference to the examples of the invention set forth below.

EXAMPLES 1–3, 5–7, 8–10 AND 12–14

The blends of this invention are produced by a general procedure comprising tumble blending components (a) and (b) as set forth in Table I, until a homogeneous mixture is obtained (approximately 1 minute). The mixture was charged to a cold Banbury mill, milled until fluxed for about 3 to 5 minutes and then ground. The ground mixture was extruded at 520° F. and 150 rpm in a vacuum vented, tapered, counter-rotating, intermeshing twin screw extruder manufactured by Haake. The compounded mixture was injection molded in a 1.5 ounce, 25 ton Battenfeld injection molding machine with a barrel temperature of 450° F. and mold temperature of 140° F. The molding cycle for the tensile and flex bars consisted of a 10 second injection time, 20 second cooling time, and 2 second mold open time, with a maximum injection speed (15 setting) and a screw speed setting of 2.

The blends of Comparative Examples 4, 8, 11 and 15 were produced in the same manner as set forth above for the examples.

The physical properties set forth in the Tables were measured by the following methods:

| | |
|---|---|
| Tensile Strength | ASTM D-638 (using a 2 in/min. crosshead without extensometer) |
| Break Elongation | ASTM D-638 |
| Yield Elongation | ASTM D-638 |
| Flexural Modulus | ASTM D-790 and D-618, Procedure A (0.5 in/min. crosshead speed and center section of a molded T-bar) |
| Flexural Strength | ASTM D-638, Procedure A (center section of a molded T-bar) |
| Notched Izod | ASTM D-256-87 |
| Weldline Strength | ASTM D-638 |

TABLE I

| | Examples | | Comparative Examples | |
|---|---|---|---|---|
| Blend | 1 | 2 | 3 | 4 |
| PP-g-PS[1] | 50 | 60 | 70 | 60 |
| Ethylene-propylene rubber impact modified polypropylene-g-PS[2] | 50 | 40 | 30 | — |
| Hi-Fax RA-063 resin[3] | — | — | — | 40 |
| Sandostab P-EPQ | 0.07 | 0.07 | 0.07 | 0.07 |
| Irganox 1010 stabilizer | 0.07 | 0.07 | 0.07 | 0.07 |
| DSTDP[4] | 0.25 | 0.25 | 0.25 | 0.25 |
| Tensile Strength, psi | 3130 | 3510 | 3710 | 3510 |
| Weldline Strength, psi | 2710 | 3000 | 3330 | 2470 |
| Retained Strength, % | 87 | 85 | 90 | 70 |
| Flex. Modulus, kpsi | 163 | 198 | 213 | 205 |
| Flex. Strength, psi | 5100 | 6010 | 6500 | 5990 |
| Yield Elongation, % | 11 | 9 | 8 | 9 |
| Break Elongation, % | 163 | 102 | 98 | 82 |
| Notched Izod, ft-lb/in | 11.0 | 2.6 | 1.4 | 1.6 |

[1]Polypropylene grafted with styrene, 46% styrene content, 2.5 parts of (parts of t-butylperoxy-2-ethyl hexanoate/100 parts polypropylene) active peroxide, grafting temp. 116° C., styrene 84.4 pph, feed rate 0.77 pph/min for 110 min. deactivation at 130° C. for 3 hours produced by the peroxide method set forth herein.
[2]Ethylene/propylene rubber impact modified polypropylene grafted with styrene, 13% styrene content, 0.50 parts of (parts of t-butylperoxy-2-ethyl hexanoate/100 parts polypropylene) active peroxide, grafting temp. 106° C., styrene 15.0 pph, feed rate 0.75 pph/min for 20 min, deactivation at 100° C. for 3 hours produced by the peroxide method set forth herein.
[3]Ethylene/propylene rubber impact modified polypropylene, 40% ethylene content, commercially available from HIMONT Italia S.r.l.
[4]Distearylthiodipropionate, commercially available.

The blends set forth in Table II were prepared according to the general procedure used for the blends in Table I, except that a methyl methacrylate grafted polypropylene was used instead of the styrene grafted polypropylene and methyl methacrylate grafted ethylene/propylene rubber modified polypropylene was used instead of the styrene grafted ethylene/propylene rubber modified polypropylene.

TABLE II

| Blend | Examples | | Comparative Examples | |
|---|---|---|---|---|
| | 5 | 6 | 7 | 8 |
| PP-g-PMMA[1] | 70 | 50 | 70 | 50 |
| Ethylene-propylene rubber impact modified polypropylene-g-PMMA[2] | 30 | 50 | — | — |
| Hi-Fax RA-063 resin | — | — | 30 | 50 |
| Sandostab P-EPQ | 0.07 | 0.07 | 0.07 | 0.07 |
| Irganox 1010 stabilizer | 0.07 | 0.07 | 0.07 | 0.07 |
| DSTDP | 0.25 | 0.25 | 0.25 | 0.25 |
| Tensile Strength, psi | 3850 | 3150 | 3760 | 2950 |
| Weldline Strength, psi | 3670 | 2850 | 3140 | 2320 |
| Retained Strength, % | 95 | 90 | 84 | 79 |
| Flex. Modulus, kpsi | 233 | 172 | 229 | 177 |
| Flex. Strength, psi | 6860 | 5130 | 6660 | 5130 |
| Yield Elongation, % | 9 | 11 | 8 | 11 |
| Break Elongation, % | 83 | 113 | 88 | 168 |
| Notched Izod, ft-lb/in | 2.5 | 4.0 | 2.4 | 5.0 |

[1]Polypropylene grafted with methyl methacrylate (MMA), 45% MMA content, 2.0 parts of (parts of t-butyl- peroxy-2-ethyl hexanoate/100 parts polypropylene) active peroxide, grafting temp. 120° C., MMA 80.9 pph, BA 2.0 pph, feed rate 0.82 pph/min for 105 min, deactivation at 140° C. for 20 minutes produced by the peroxide method set forth herein.
[2]Ethylene/propylene rubber impact modified polypropylene grafted with MMA, 23% MMA content, 0.50 parts of (parts of t-butylperoxy-2-ethyl hexanoate/100 parts polypropylene) active peroxide, grafting temp. 100° C., MMA 30.0 pph, BA 2.0 pph, feed rate 1.40 pph/min for 23 min, deactivation at 110° C. for 60 minutes produced by the peroxide method set forth herein.

The blends set forth in Table III were prepared according to the general procedure used for the blends in Table I, except that a styrene/acrylonitrile grafted polypropylene and styrene/acrylonitrile grafted ethylene/propylene rubber modified polypropylene were used instead of the styrene grafted polypropylene and styrene grafted ethylene/propylene rubber modified polypropylene.

TABLE III

| Blend | Examples | | Comparative Examples | |
|---|---|---|---|---|
| | 8 | 9 | 10 | 11 |
| PP-g-PSAN[1] | 70 | 50 | 70 | 50 |
| Ethylene-propylene rubber impact modified polypropylene-g-PSAN[2] | 30 | 50 | — | — |
| Hi-Fax RA-063 resin | — | — | 30 | 50 |
| Sandostab P-EPQ | 0.07 | 0.07 | 0.07 | 0.07 |
| Irganox 1010 stabilizer | 0.07 | 0.07 | 0.07 | 0.07 |
| DSTDP | 0.25 | 0.25 | 0.25 | 0.25 |
| Tensile Strength, psi | 3890 | 3000 | 3650 | 2800 |
| Weldline Strength, psi | 3590 | 2810 | 2950 | 2130 |
| Retained Strength, % | 92 | 94 | 81 | 76 |
| Flex. Modulus, kpsi | 231 | 154 | 219 | 175 |
| Flex. Strength, psi | 6840 | 4800 | 6360 | 5060 |
| Yield Elongation, % | 9 | 12 | 8 | 10 |
| Break Elongation, % | 58 | 90 | 43 | 70 |
| Notched Izod, ft-lb/in | 1.5 | 4.2 | 1.0 | 3.2 |

[1]Polypropylene grafted with styrene/acrylonitrile (SAN)(3:1 wt ratio), 46% SAN content, 2.0 parts of (parts of t-butylperoxy-2-ethyl hexanoate/100 parts polypropylene) active peroxide, grafting temp. 120° C., SAN 84.2 pph, feed rate 1.02 pph/min for 85 min, deactivation at 140° C. for 30 min. produced by the peroxide method set forth herein.
[2]Ethylene/propylene rubber impact modified polypropylene grafted with PAN (3:1 wt ratio), 23.2% SAN content, 1.0 parts of (parts of t-butylperoxy-2-ethyl hexanoate/100 parts polypropylene) active peroxide, grafting temp- 100° C., SAN 30.2 pph, feed rate 1.04 pph/min for 31 min, deactivation at 110° C. for 45 min. produced by the peroxide method set forth herein.

The blends set forth in Table IV were prepared according to the general procedure used for the blends in Table I, except that Royaltuf 160 styrene grafted ethylene/propylene/non-conjugated diene monomer, was used instead the styrene grafted ethylene/propylene rubber modified polypropylene.

TABLE IV

| Blend | Examples | | | Comparative Example |
|---|---|---|---|---|
| | 12 | 13 | 14 | 15 |
| Pp-g-PS[1] | 80 | 70 | 60 | 100 |
| Royaltuf 160[2] | 20 | 30 | 40 | — |
| Sandostab P-EPQ | 0.07 | 0.07 | 0.07 | 0.07 |
| Irganox 1010 stabilizer | 0.07 | 0.07 | 0.07 | 0.07 |
| DSTDP | 0.25 | 0.25 | 0.25 | 0.25 |
| Flex. Modulus, kpsi | 245 | 211 | 175 | 309 |
| Break Elongation, % | 49 | 96 | 126 | 4.2 |
| Notched Izod, ft-lb/in. | 1.6 | 3.5 | 6.2 | 0.24 |

[1]Polypropylene grafted with styrene, 45% styrene content, 1.57 parts of (parts of t-butylperoxy-2- ethylhexanoate/100 parts propylene) active peroxide, grafting temp. 100° C., styrene 84.4 pph, feed rate 2.41 pph/min., for 30 min. deactivation at 131° C. produced by the peroxide method set forth herein.
[2]40% styrene content, commercially available.

EXAMPLES 16, 17 AND 20–24

Illustrated below are blends of the further embodiment of this invention produced by tumble blending components (a), (b) and (c) as set forth in Table V and VI, until a homogeneous mixture is obtained (approximately 2 minutes). The mixture was charged to a Banbury mill, milled at 360° F. for about 3 to 5 minutes and then ground. The ground mixture was extruded at a temperature of from 475°–550° F. and 150 rpm in a tapered, counter-rotating, intermeshing twin screw extruder manufactured by Haake. The compounded mixture was injection molded in a 1.5 ounce, 25 ton Battenfeld injection molding machine with a barrel temperature of 450° F. and a mold temperature of 140° F. The molding cycle for the tensile and flex bars consisted of a 10 second injection time, 20 second cooling time, and 2 second mold open time, with a maximum injection speed (15 setting) and a screw speed setting of 2.

The blends of the Comparative Examples 18, 19 and 25 were produced in the same manner as set forth above for the examples.

TABLE V

| Blend | Examples | | Comparative Examples | |
|---|---|---|---|---|
| | 16 | 17 | 18 | 19 |
| PP-g-PSAN[1] | 72 | 64 | 100 | 80 |
| Ethylene-propylene rubber impact modified random ethylene-propylene-g-PSAN[2] | 18 | — | — | — |
| Ethylene-propylene rubber impact modified random ethylene-propylene-g-PSAN[3] | — | 26 | — | — |
| Dutral CO-059 resin[4] | 10 | 10 | — | 20 |
| Sandostab P-EPQ | 0.07 | 0.07 | 0.07 | 0.07 |
| Irganox 1010 stabilizer | 0.07 | 0.07 | 0.07 | 0.07 |
| DSTDP | 0.25 | 0.25 | 0.25 | 0.25 |
| Flex. Modulus, kpsi | 173 | 173 | 345 | 177 |
| Flex. Strength, kpsi | 4.9 | 4.9 | 11 | 4.5 |
| Notched Izod, ft-lb/in | 3.7 | 3.7 | 0.4 | 3.0 |

TABLE V-continued

|  | Examples | | Comparative Examples | |
|---|---|---|---|---|
| Blend | 16 | 17 | 18 | 19 |

[1] Polypropylene grafted with styrene/acrylonitrile(SAN) (3:1 wt. ratio), 45.5% SAN content, 2.0 parts of (parts tert-butylperoxy-2-ethyl hexanoate/100 parts Polyypropylene) active peroxide, grafting temp. 120° C., SAN 85 pph, feed rate 1.0 pph/min., deactivation at 140° C. for 30 min. produced by the peroxide method set forth herein.

[2] Ethylene-propylene rubber impact modified random ethylene-propylene copolymer grafted with SAN (2:1 wt. ratio), 17.7% SAN content, 2.0 parts of (parts tert-butylperoxy-2-ethyl hexanoate/100 parts polypropylene) active peroxide, grafting temp. 90° C., SAN 25 pph, feed rate 0.8 pph/min., deactivation at 100° C. for 30 min. produced by the peroxide method set forth herein.

[3] Ethylene-propylene rubber impact modified random ethylene-propylene copolymer, 70% EPR content, grafted with SAN (2:1 wt. ratio), 41.6 b SAN content, 1.5 parts of (parts tert-butylperoxy-2-ethyl hexanoate/100 parts polypropylene) active peroxide, grafting temp. 90° C., SAN 85 pph, feed rate 1.0 pph/min. deactivation at 100° C. for 30 min. produced by the peroxide method got forth herein.

[4] Dutral CO-059 ethylene-propylene rubber copolymer having an ethylene content of 57%.

The blends set forth in Table VI were prepared according to the procedure used for the blends in Table V, except that a styrene grafted polyporpylene and styrene grafted ethylene-propylene rubber impact modified random ethylene-propylene copolymer were used.

TABLE VI

|  | Examples | | | |
|---|---|---|---|---|
| Blend | 20 | 21 | 22 | 23 |
| PP-g-PS[1] | 78 | 71 | 66 | 81 |
| Ethylene-propylene rubber impact modified random ethylene-propylene-g-PS[2] | 17 | — | — | — |
| Ethylene-propylene rubber impact modified random ethylene-propylene-g-PS[3] | — | 21 | — | 14 |
| Ethylene-propylene rubber impact modified random ethylene-propylene-g-PS[4] | — | — | 26 | — |
| Dutral CO-059 resin[5] | 5 | 8 | 8 | 5 |
| Sandostab P-EPQ | 0.07 | 0.07 | 0.07 | 0.07 |
| Irganox 1010 stabilizer | 0.07 | 0.07 | 0.07 | 0.07 |
| DSTDP | 0.25 | 0.25 | 0.25 | 0.25 |
| Flex. Modulus, kpsi | 220 | 182 | 185 | 238 |
| Tensile Strength, psi | 4230 | 3506 | 3464 | 4470 |
| Notched Izod, ft-lb/in | 2.7 | 4.9 | 5.9 | 2.3 |

[1] Polypropylene grafted with styrene, 45.8% styrene content, 2.0 parts of (parts tert-butylperoxy-2-ethyl hexanoate/100 parts polypropylene) active peroxide, grafting temp. 120° C., PS 85 pph, feed rate. 0.9 pph/min., deactivation at 135° C. for 190 min. produced by the peroxide method set forth herein.

[2] Ethylene-propylene rubber impact modified random ethylene-propylene copolymer, 67% EPR content, grafted with styrene, 13% PS content, 0.22 parts of (parts tert-butylperoxy-2-ethyl hexanoate/100 parts polypropylene) active peroxide, grafting temp. 90° C., PS 15 pph, feed rate 1.1 pph/min., deactivation at 100° C. for 45 min. produced by the peroxide method set forth herein.

[3] Ethylene-propylene rubber Impact modified random ethylene-propylene copolymer, 67% EPR content, grafted with PS, 22.1% PS content, 1.73 parts of (parts tert-butylperoxy-2-ethyl hexanoate/100 parts polypropylene) active peroxide, grafting temp. 90° C., PS 30 pph, feed rate 0.9 pph/min. deactivation at 115° C. for 30 min. produced by the peroxide method set forth herein.

[4] Ethylene-propylene rubber impact modified random ethylene-propylene copolymer, 67% EPR content, grafted with PS, 32.7% PS content, 2.9 parts of (parts tort-butylperoxy-2-ethyl hexanoate/100 parts polypropylene) active peroxide, grafting temp. 90° C., PS 50 pph, feed rate 1.0 pph/min. deactivation at 115° C. for 30 min. produced by the peroxide method not forth herein.

[5] Dutral CO-059 ethylene-propylene rubber copolymer having an ethylene content of 57%.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A thermoplastic blend consisting essentially of, by weight, (A) 40 to 90% of a graft copolymer of a propylene polymer material selected from the group consisting of (i) a homopolymer of propylene, (ii) a random copolymer of propylene and an olefin selected from the group consisting of ethylene and 4–10 carbon alpha-olefins, wherein when the olefin is ethylene, the maximum polymerized ethylene content is about 10%, and when the olefin is a 4–10 carbon alpha-olefin, the maximum polymerized content thereof is about 20%, and (iii) a random terpolymer of propylene with two alpha-olefins selected from the group consisting of ethylene and 4–8 carbon alpha-olefins, wherein the maximum polymerized 4–8 carbon alpha-olefin content is about 20%, and when ethylene is one of the alpha-olefins, the maximum polymerized ethylene content is about 5%, having 5 to 70% monomer graft polymerized thereto, (B) 5 to 40% of a graft copolymer of an olefin rubber copolymer having 5 to 50% monomer graft polymerized thereto, and (C) 5 to 20% of an ungrafted olefin rubber, wherein the grafting monomers are selected from the group consisting of (i) an aromatic vinyl compound, (ii) an acrylic compound, (iii) mixtures of (i) and (ii), and (iv) other polymerizable monomers selected from the group consisting of $C_1$–$C_{10}$ linear or branched alkyl acrylates, acrylic acid, methacrylic acid, glycidyl methacrylate, glycidyl acrylate, acrylonitrile and methacrylonitrile with at least one (i) or at least one (ii) or mixtures of at least one (i) and at least one (ii) wherein said other polymerizable monomer is present in an amount of up to 50% and the total amount of (B)+(C) is from 10 to 60% of the total blend.

2. The blend of claim 1, wherein said olefin rubber copolymer is selected from the group consisting of an ethylene/propylene copolymer rubber; an ethylene/butene copolymer rubber; a propylene-butene copolymer rubber; an ethylene/propylene/non-conjugated diene monomer rubber; an ethylene/propylene/butene terpolymer rubber; a homopolymer of propylene impact modified with ethylene/propylene copolymer rubber, an ethylene/butene copolymer rubber, an ethylene/propylene/butene terpolymer rubber or ethylene/propylene/non-conjugated diene monomer rubber; and a random copolymer of propylene and an alpha-olefin selected from ethylene and $C_4$–$C_{10}$ alpha-olefins impact modified with ethylene/propylene copolymer rubber, ethylene/propylene/non-conjugated diene monomer rubber, an ethylene/butene copolymer rubber or an ethylene/propylene/butene terpolymer rubber.

3. The blend of claim 1, wherein the grafting monomer is styrene.

4. The blend of claim 3, wherein (A) is a graft copolymer of styrene on a polypropylene backbone and (B) is a graft copolymer of styrene on an ethylene/propylene copolymer rubber impact modified polypropylene backbone.

5. The blend of claim 4, wherein (C) is an ethylene/propylene copolymer rubber.

6. The blend of claim 1, wherein the grafting monomer is styrene/acrylonitrile.

7. The blend of claim 6, wherein (A) is a graft copolymer of styrene/acrylonitrile on a polypropylene backbone and (B) is a graft copolymer of styrene/acrylonitrile on an ethylene/propylene copolymer rubber impact modified polypropylene backbone.

8. The blend of claim 7, wherein (C) is an ethylene/propylene copolymer rubber.

9. The blend of claim 1, wherein (A) is present in the amount of from 60 to 85%, (B) is present in the amount of from 10 to 25%, and (C) is present in the amount of from 5 to 10%, wherein the total amount of (B)+(C) is from 15 to 35% of the total blend.

* * * * *

UNITED STATES PATENT AND TRADEMARK OFFICE
CERTIFICATE OF CORRECTION

PATENT NO. : 5,473,015
DATED : December 5, 1995
INVENTOR(S) : DeNicola, Jr. et al It is certified that error appears in the above-indentified patent and that said Letters Patent is hereby corrected as shown below:

At col. 7, line 64, change "PAN" to --SAN--.

At col. 9, line 17, change "41.6 b" to --41.6 %--.

Signed and Sealed this

Twenty-third Day of July, 1996

*Attest:*

BRUCE LEHMAN

*Attesting Officer*     *Commissioner of Patents and Trademarks*